Nov. 1, 1960 D. SINGELMANN 2,958,183
ROCKET COMBUSTION CHAMBER
Filed Feb. 24, 1949
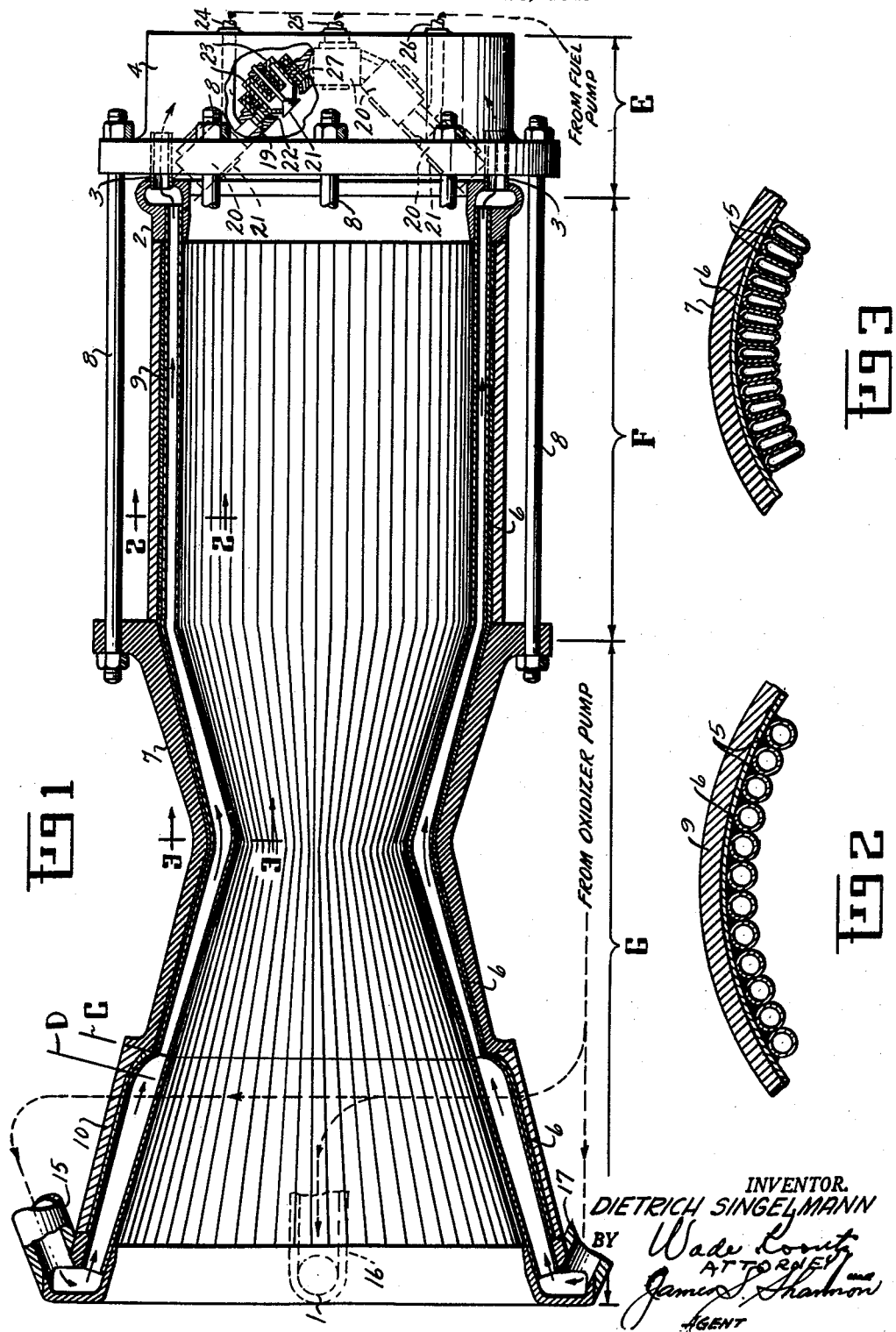
INVENTOR.
DIETRICH SINGELMANN United States Patent Office 2,958,183
Patented Nov. 1, 1960

2,958,183

ROCKET COMBUSTION CHAMBER

Dietrich Singelmann, Berlin-Haselhorst, Germany, assignor to the United States of America as represented by the Secretary of the Air Force Filed Feb. 24, 1949, Ser. No. 78,202

4 Claims. (Cl. 60—35.6)

(Granted under Title 35, U.S. Code (1952), sec. 266)

The invention described herein may be manufactured and used by or for the Government for governmental purposes without payment to me of any royalty thereon.

This invention relates to reaction engines of the type used in rockets and particularly to the combustion chambers of such engines.

In reaction engines for rocket aircraft it is desirable to have high thrust output while keeping weight and size as small as possible. Since the thrust output of a combustion chamber is directly proportional to the combustion chamber temperature, high values of thrust are accompanied by high combustion chamber temperatures and pressures which produce severe cooling and strength requirements if the weight of the engine is to be kept within acceptable limits.

In smaller reaction engines the combustion chambers are equipped with cooling jackets, in which case the inner liner of the combustion chamber has to withstand the pressure difference between the cooling medium and the combustion chamber pressure. As the size of such a combustion chamber is increased the wall thickness must increase in proportion to the increase in diameter in order to be able to withstand the increased stress. At increasing wall thickness, however, the mean temperature as well as the temperature drop in the combustion chamber liner increases so that eventually the safe operating temperature of the liner is exceeded. Further, the increase in wall thickness introduces an undesired increase in weight. There is, therefore, a limit to the size of combustion chambers of the above described type.

As a solution to the problem of adequate cooling in large high thrust combustion chambers it has been proposed to construct the wall of the combustion chamber of parallel tubes extending in the direction of gas flow and carrying a liquid coolant under high pressure. Since the diameters of the tubes are small a very small wall thickness is required to withstand high coolant pressures, this thin wall of metal between the coolant and the hot gases in the combustion chamber being highly advantageous from the standpoint of heat transfer. It is the object of this invention to provide an improved combustion chamber of the axial tube type which is of light weight construction and yet has sufficient strength and cooling to withstand the high pressures and temperatures developed in a high thrust engine. In accordance with the invention the chamber is so designed that in no place is there a greater thickness of metal between the coolant and the hot gases than that in the tube walls. Further, in accordance with the invention, increased cooling is provided in the area of highest thermal load by decreasing the cross-sectional areas of the tubes in that area to increase the velocity of the coolant for the more rapid removal of heat. To withstand the high radial pressure against the wall of the chamber without adding excessive weight the outside of the chamber is wound with a number of layers of fine wire of high tensile strength.

A preferred embodiment of the invention will be described in connection with the accompanying drawings in which Fig. 1 is a cross-sectional view of a high thrust combustion chamber in accordance with the invention, and Figs. 2 and 3 are cross-sectional views of the tubes in Fig. 1 taken at planes 2—2 and 3—3, respectively, in Fig. 1.

Referring to Fig. 1 the combustion chamber may be divided into a head section E, a main combustion section F and a nozzle section G. The head section E serves to inject the two propellants, fuel and oxidizing agent, one of which is used as the coolant, under high pressure through suitable nozzles into the main section F where combustion takes place. The actual design of the head forms no part of the invention and hence the details thereof are not shown. The main combustion section F is a cylindrical space which leads into the nozzle section G, the latter converging first to form a throat of smaller diameter than the main combustion section and then diverging uniformly to the outlet of the nozzle.

As will be seen from Fig. 1 the wall of the entire combustion chamber is made up of parallel thin walled tubes extending longitudinally of the chamber. A suitable material for these tubes is stainless steel although other materials such as aluminum may also be used. The inlet ends of the tubes terminate in an annular input manifold 1 and the outlet ends in a similar annular output manifold 2. The coolant, which as was stated may be one of the propellants, is introduced under high pressure into the input manifold 1 through pipes 15, 16, 17 and a fourth pipe opposite pipe 16 but not shown, which receive coolant under pressure from the oxidizer pump. The coolant flows along the parallel tubes to output manifold 2 and thence through connecting passageways 3 into head 4 where it is injected with the other propellant into the combustion chamber. As an example, the propellants may be gasoline, serving as the fuel, and concentrated nitric acid, serving as the oxidizing agent, the latter serving also as the coolant.

The internal construction of the head 4 is not a part of the invention, however it is shown in simplified detail in Fig. 1 as an aid in illustrating the operation of the combustion chamber. The head has an internal conically shaped jacketed wall 19 in which are positioned a plurality of injection nozzles 20 one of which is shown in cross-section. The nozzle 20 has a valve 21 for admitting the oxidizing agent to the combustion chamber and a valve 22, concentric with valve 21, for admitting the fuel to the chamber. Both of these valves are biased closed by coil springs as shown but open under pressure of the liquid propellants. The coolant passing through tubes 3 fills the cavity between the inner wall 19 and the outer wall of the head, whence it passes through openings 23 and valves 21 of the nozzles into the combustion chamber. The fuel is forced by the fuel pump through pipes 24, 25, 26 and a fourth pipe, not shown, but opposite pipe 25, into the jacket of wall 19, whence it flows through openings, such as 27, into the outer bodies of the nozzles and from there through valves 22 into the combustion chamber.

The amount of cooling required at any point along the combustion chamber is determined by the temperature and velocity of the gases at that point. In a combustion chamber of the described type the temperature and velocity values may be of the order of the following:

|  | Temperature, °C. | Velocity, meters/sec. |
|---|---|---|
| Main combustion section F | 2,700 | 175 |
| Throat portion of section G | 2,300 | 1,000 |
| Outlet portion of section G | 1,700 | 2,000 |

It is seen from the above table that the greatest thermal load occurs at the small diameter throat section of the combustion chamber due to both the high temperature and high velocity of the gases at this point. In accordance with the invention increased cooling is provided in this portion of the chamber by increasing the velocity of the coolant at this point. This is accomplished by gradually flattening the tubes into an oval shape as the point of minimum throat diameter is approached, the resulting decrease in cross-sectional area of the tubes being responsible for the increased velocity of the coolant. The change in cross-section may be seen more clearly by referring to Figs. 2 and 3. Fig. 2 is a section taken at point 2—2 in Fig. 1, at which point the tubes are circular. As the combustion chamber converges toward the throat the tubes are gradually flattened until they assume the shape shown in Fig. 3, which is a section taken at point 3—3 in Fig. 1. As the tubes continue from the throat along the diverging nozzle portion of the chamber they gradually resume their circular shape becoming exactly circular again at point C where the circumference of the chamber is the same as at the point where convergence toward the throat began.

The above described flattening of the tubes in addition to providing a needed increase in coolant velocity also has a structural advantage since it permits the same number of tubes to occupy the reduced circumferences of the throat section as are used in the main combustion section G where the circumference is larger.

If the same diameter tube were used beyond point C along the diverging nozzle portion it would be necessary now to flatten the tubes in the opposite direction in order for the same number of tubes to fill the increasing circumference. However, this flattening would be undesirable since increased coolant velocity is not needed at this point, due to the relatively lighter thermal load in the nozzle, and the decreased cross-sectional area of the tubes would cause an increased pressure drop in the cooling system. In order to avoid this pressure drop tubes of larger diameter are used from point C to the manifold 1. These tubes are flattened, in the same manner that the smaller tubes were flattened at point 3—3, until the radius of the inner side equals the radius of the circular smaller tubes at point C. The outer portions of the larger tubes are formed downward toward the smaller tubes to form a circular opening equal in diameter to the smaller tubes so that the two tubes may be welded together. As the larger tubes continue along the diverging nozzle their cross-sections gradually change from the oval shape at point D to a circular cross-section at the input manifold 1. The cross-sections of the tubes at point C are the same as shown in Fig. 2, whereas at point D and at manifold 1 the cross-sections, except for the difference in the size of the tubes, are the same as shown in Figs. 3 and 2, respectively.

In order to make the wall of the combustion chamber, formed by the parallel tubes, gas tight, a filling of metal is run between each adjacent pair of tubes as shown at 5 in Figs. 2 and 3. It is important that this filling be made on the back side of the tubes for, if made on the side next to the hot gases of the combustion chamber, the increased thickness of metal in the filling would retard the heat transfer to the coolant and cause excessive heating at that point. This filling may be accomplished by welding, soldering or casting, the latter being particularly applicable when aluminum tubes are employed. To further seal the chamber against the leakage of gases a metal sheet 6 is formed to the external contour of the chamber and placed thereover. This cover may be made in two sections which may be welded together after being placed over the combustion chamber.

The strength of the above described metal filling and cover will not ordinarily be sufficient to withstand the radial pressures developed in the combustion chamber. In order to withstand this pressure in the region of the throat a metal collar 7 conforming to the external shape of the nozzle in this region is provided. This collar may be made in two pieces which are joined by means of suitable flanges and bolts or by welding after being placed over the combustion chamber. The collar 7 also performs the function of relieving the tubes in the main combustion section F of tensional stress due to the gas pressure in the chamber, this stress being transferred instead to bolts 8 extending between collar 7 and head 4.

In the main combustion section F and the nozzle section beyond collar 7 the chamber is strengthened against radial pressure by winding a number of layers of small steel wire of high tensile strength over the cover 6. This reinforcement is indicated by reference numeral 9 for section F and reference numeral 10 for the nozzle section. Since the pressures become comparatively small toward the end of the nozzle the wire reinforcement required is much less than for the high pressure section F and in some cases may not be required.

What I claim is:

1. A rocket combustion chamber of circular cross-section having in the direction of gas flow a substantially cylindrical main combustion section, a throat section converging to a minimum diameter smaller than that of said main portion and a nozzle section diverging from the minimum diameter of said throat section, the wall of said combustion chamber being formed of a plurality of thin walled tubes through which a coolant may be passed, said tubes being placed in parallel touching relationship about the circumference of said chamber and each extending for the full length of the chamber in the direction of gas flow in said chamber, said tubes having circular cross-sections in said main combustion section and being gradually flattened in a radial direction in converging to said minimum diameter in said throat section and gradually returning to a circular cross-section in diverging from said minimum diameter in said nozzle section, whereby the cross-sectional area of said tubes in the vicinity of said minimum diameter of the combustion chamber is reduced to increase the velocity of the coolant in said tubes for increased cooling at this point.

2. Apparatus as claimed in claim 1 in which a gas-tight seal is produced between each pair of tubes by a continuous filling of metal between each pair of adjacent tubes, said filling being made on the outside of said combustion chamber wall so as not to retard heat flow from the hot gas of said chamber through the walls of said tubes to the coolant.

3. Apparatus as claimed in claim 2 in which a head assembly closes the input end of said main combustion section, a metallic collar surrounding said throat section, and tension members extending between said collar and said head assembly.

4. Apparatus as claimed in claim 3 in which said combustion chamber between said head assembly and said collar is wrapped with a sufficient number of layers of small wire of high tensile strength to withstand the radial pressures in said combustion chamber.

References Cited in the file of this patent

UNITED STATES PATENTS

| | | |
|---|---|---|
| 2,395,403 | Goddard | Feb. 26, 1946 |
| 2,408,112 | Truax et al. | Sept. 24, 1946 |
| 2,470,564 | Lawrence et al. | May 17, 1949 |

FOREIGN PATENTS

| | | |
|---|---|---|
| 376,974 | Great Britain | July 21, 1932 |

Disclaimer 2,958,183.—*Dietrich Singelmann*, Berlin-Haselhorst, Germany. ROCKET COMBUSTION CHAMBER. Patent dated Nov. 1, 1960. Disclaimer filed Feb. 6, 1964, by the assignee, the *United States of America as represented by the Secretary of the Air Force*.

Hereby enters this disclaimer to claims 1 and 2 of said patent.

[*Official Gazette May 5, 1964.*]